US008909842B2

(12) United States Patent
Johnson

(10) Patent No.: US 8,909,842 B2
(45) Date of Patent: *Dec. 9, 2014

(54) HIGH CURRENT MULTI-PORT USB HUB

(71) Applicant: Bretford Manufacturing, Inc., Franklin Park, IL (US)

(72) Inventor: David Johnson, San Francisco, CA (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,337

(22) Filed: Nov. 9, 2012

(65) Prior Publication Data
US 2013/0073776 A1    Mar. 21, 2013

Related U.S. Application Data

(63) Continuation of application No. 13/017,098, filed on Jan. 31, 2011, now Pat. No. 8,312,199.

(51) Int. Cl.
*G06F 13/36* (2006.01)
*G06F 13/40* (2006.01)

(52) U.S. Cl.
CPC .................................. *G06F 13/4022* (2013.01)
USPC ............................ 710/312; 710/305; 713/340

(58) Field of Classification Search
USPC .......... 710/312, 305–306, 100; 713/300–340
See application file for complete search history.

(56) References Cited

U.S. PATENT DOCUMENTS

| 7,984,318 | B2 * | 7/2011 | Fu et al. | 713/340 |
| 2007/0278999 | A1 * | 12/2007 | Hsia | 320/111 |
| 2009/0096336 | A1 * | 4/2009 | Petrick et al. | 312/237 |
| 2011/0145445 | A1 * | 6/2011 | Malamant et al. | 710/16 |
| 2011/0273144 | A1 * | 11/2011 | Yu et al. | 320/162 |
| 2012/0084592 | A1 * | 4/2012 | Lin et al. | 713/324 |
| 2012/0166173 | A1 * | 6/2012 | Fischbach | 703/28 |

* cited by examiner

*Primary Examiner* — Faisal M Zaman
*Assistant Examiner* — Kim Huynh
(74) *Attorney, Agent, or Firm* — Anderson Gorecki & Rouille LLP

(57) ABSTRACT

A high-current Multi-Port USB hub has a microcontroller that selectively switches the hub between low current synchronizing state and high current charging state. During charging state in excess of two Amps of current can be provided to each device connected to the hub. Each USB port circuit includes a power FET to selectively provide current to the USB port according to the state of the hub. Current sensors on each of the USB ports detects an amount of current being drawn by a device connected to the USB port. Each USB port is provided with indicators to indicate the charged state of the device connected to that port. The charge state of the device is also provided to the microcontroller which provides a summary status indication of the set of devices connected to the USB hub.

18 Claims, 2 Drawing Sheets

HIGH CURRENT MULTI-PORT USB HUB

CROSS-REFERENCE TO RELATED APPLICATIONS

This application is a continuation of U.S. patent application Ser. No. 13/017,098, filed Jan. 31, 2011, the content of which is hereby incorporated herein by reference.

BACKGROUND OF THE INVENTION

1. Field of the Invention

The present invention relates to power systems and, more particularly, to an electrical charging and synchronizing system.

2. Description of the Related Art

Portable computing devices, such iPad tablet computers and other tablet computers, are commonly used in educational facilities to enrich the curriculum provided to students. Likewise, these types of devices are increasingly being used in other contexts, such as in museums, to enable people to interact with the exhibits present in the museum.

Portable computing devices typically include a battery that may be charged to enable the portable computing devices to be used while not connected to an electrical outlet. The iPad™ (Apple, Inc.) portable computing device, in particular, is designed to be connected to a Universal Serial Bus (USB) port to be charged, but is designed to draw up to 2.1 Amperes of electricity, which greatly exceeds USB 2.0 standard current level. Accordingly, it would be advantageous to provide a multi-port hub configured to provide high current low voltage power over ports having standard USB physical configuration.

SUMMARY OF THE INVENTION

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A high-current Multi-Port USB hub has a microcontroller that controls the hub to selectively enable portable computing devices connected to USB ports of the USB hub to be synchronized or to be provided in excess of 2 Amps 5V DC power. Each USB port is connected to USB port circuitry which includes a power FET to selectively apply low current charging power while the USB hub is in the synchronizing state and to provide high current charging power when the USB hub is in the high current charging state. Device charging state control circuitry at each USB port sets the voltage at the USB port to instruct the portable computing device connected to the port to enter synchronizing mode or to enter high current charging state mode. Current sensors on each of the USB ports detects a state of the device connected to the port. Charge status indicators are provided on a per-port basis to allow the individual charging state of the device connected to the port to be monitored so that it is possible to visually verify that the device is connected and charging or fully charged. The charge state of the device is provided to the microcontroller which summarizes the status of the set of devices connected to the USB hub to indicate whether the devices are charging or charged.

BRIEF DESCRIPTION OF THE DRAWINGS

Aspects of the present invention are illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures.

DETAILED DESCRIPTION

Figure 1:
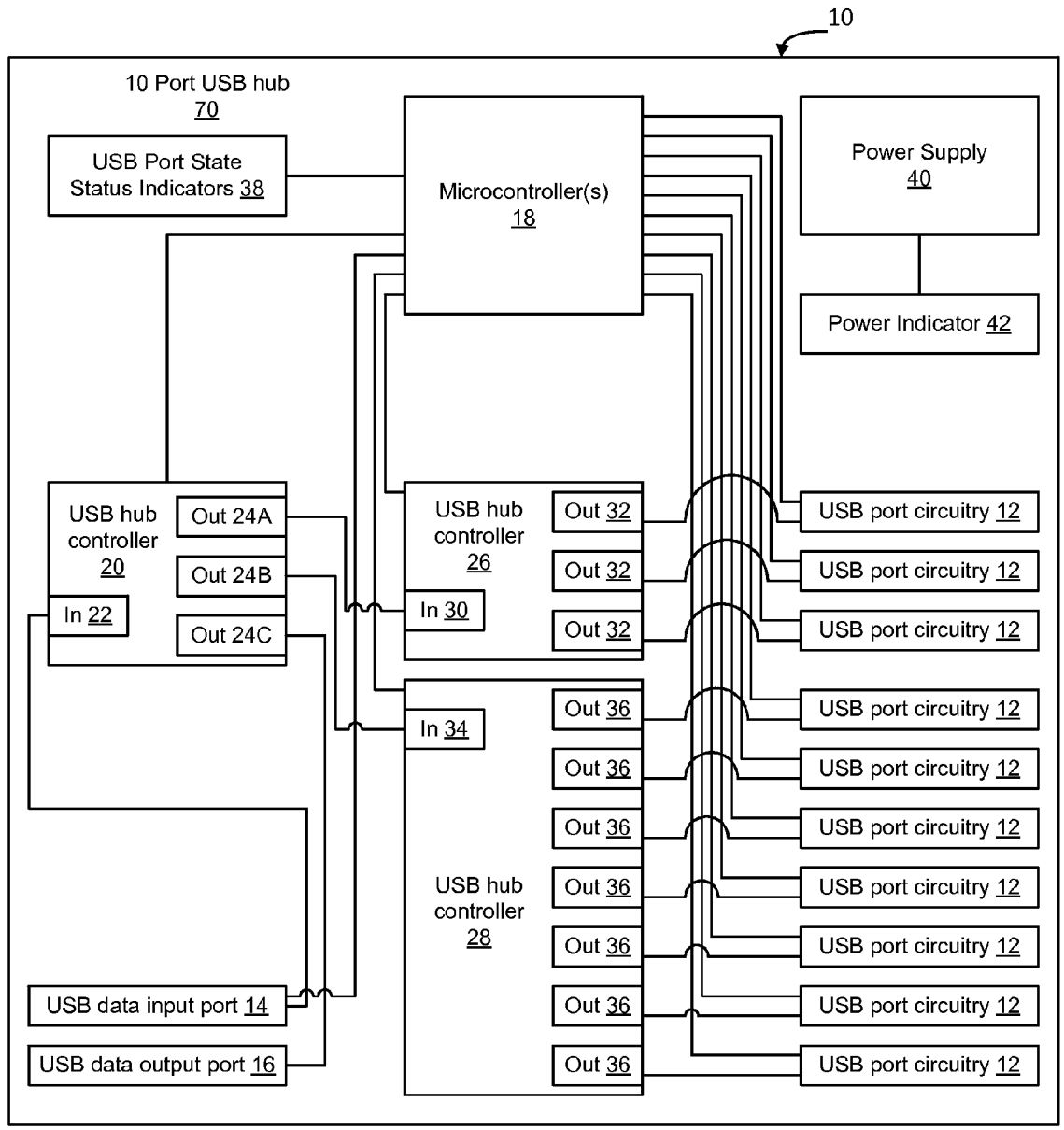
FIG. 1 is a functional block diagram of an embodiment of a high current multi-port USB hub according to an embodiment.
Figure 2:
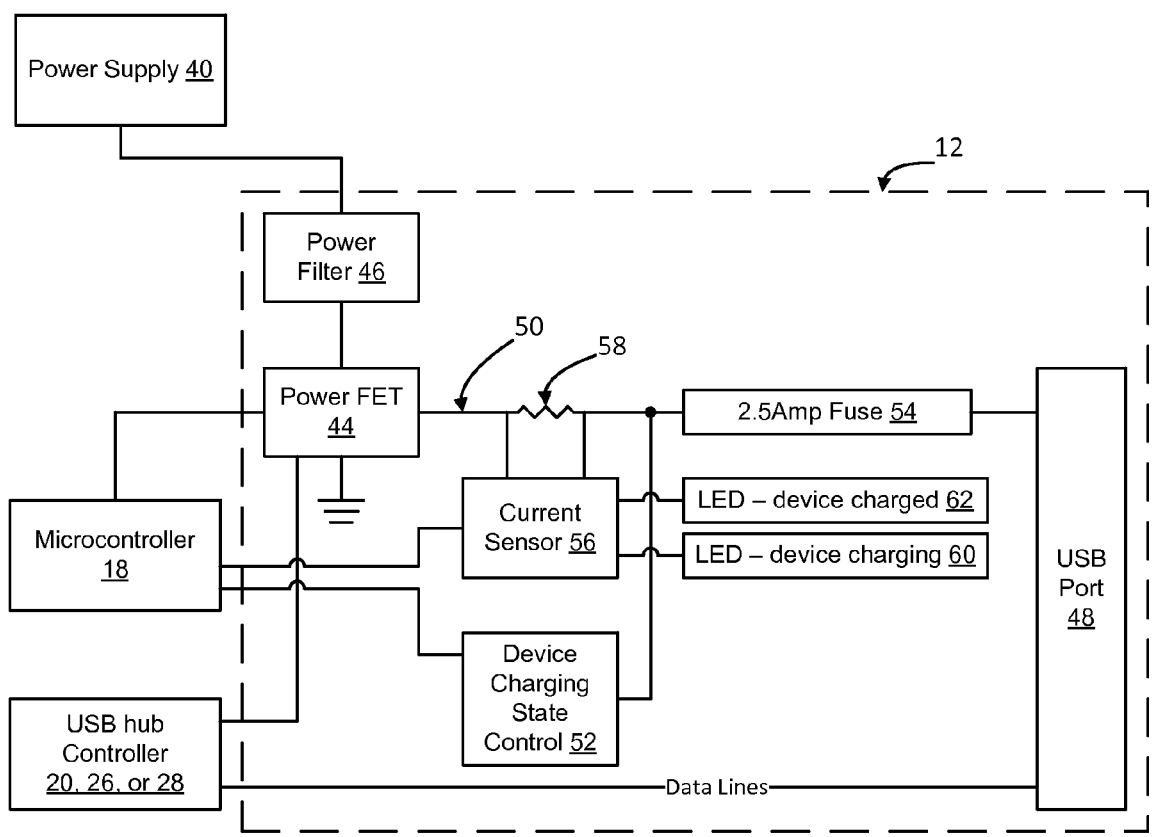
FIG. 2 is a functional block diagram of an embodiment of USB port circuitry for use in the high current multi-port USB hub of FIG. 1.

FIG. 1 shows an embodiment of a high current multi-port USB hub 10. The hub 10 shown in FIG. 1 has ten high current USB ports 12 and two normal USB data ports 14, 16. Details of one embodiment of high current output port circuitry is shown in FIG. 2 and will be described in greater detail below. Although in this embodiment the high current multi-port USB hub 10 has ten high current USB ports 12, other numbers of high current USB ports may be used as well.

The USB data input port 14, in one embodiment, is a USB Standard-B port. The data input port allows the USB hub 10 to be connected to a master computer so that portable computing devices, when connected to the high current USB ports 12, can be synchronized with the master computer. The USB data output port 16, in one embodiment, is a USB Standard-A port, which is designed to enable multiple similarly configured USB hubs 10 to be serially connected to enable portable computing devices connected to other similarly configured USB hubs 10 to also be synchronized with the master computer.

The USB hub 10 includes one or more microcontrollers 18 which control operation of the UBS hub 10. In one embodiment the USB hub 10 is designed to provide low charging current to portable computing devices connected to USB ports 12 when a master computer is synchronizing data with the portable computing devices, and is designed to provide higher current to the USB ports when the master computer is not synchronizing data to the portable computing devices. In this embodiment, the microcontroller is connected to the USB data input port 14 to enable the microcontroller to sense when the master computer is connected to the USB data input port.

The USB hub has a root four port USB hub controller 20 having an input port 22 and three output ports 24A, 24B, and 24C. Output port 24A is connected to a second four port USB hub controller 26. Output port 24B is connected to an eight port USB hub controller 28. Output port 24C is connected to USB data output port 16.

Four port USB hub controller 26 has an input port 30 and three output ports 32. Each of the output ports 32 is connected to an iteration of USB hub circuitry 12 shown in FIG. 2. Eight port USB hub controller 28 has an input port 34 and seven output ports 36. Each of the output ports 36 is connected to an iteration of USB hub circuitry 12 shown in FIG. 2. The microcontroller is 18 is connected to USB hub controllers 20, 26, 28, and is also connected to each iteration of USB port circuitry 12.

The microcontroller 18 receives input from each iteration of the USB port circuitry 12 to enable the microcontroller to obtain the charge status of a portable computing device connected to the USB port circuitry. The microcontroller determines the status of the portable computing devices connected to the USB hub 10 and provides a visual indication of the charge status (i.e. whether all portable computing devices are charged or whether one or more of the portable computing devices is still charging) via USB port state indicators 38. In one embodiment, the port state indicators include a yellow Light Emitting Diode (LED) which is illuminated when one or more of the portable computing devices connected to the hub is not fully charged, and includes a green LED which is illuminated to indicate that all portable computing devices connected to the hub are fully charged.

The hub 10 further includes a power supply system 40 which receives power from an external source and distributes power to the components of the hub. In one embodiment, the USB hub is configured to operate using approximately 5V DC power which is provided to the hub components by power supply 40. USB version 2.0 specifies that the output voltage should be between 4.75 and 5.25 V DC. In one embodiment the hub 10 is compliant with this requirement of USB 2.0. When the hub is connected to an external power source, a power indicator 42 is illuminated to provide visual verification that the hub is operational. The power indicator may be implemented using a blue LED or other visual indicator.

USB standard 2.0 provides for the output ports to provide power to attached devices at approximately 5V DC and up to 500 mA of current. In one embodiment, the USB port circuitry 12 is configured to provide up to 2.1 A of power at approximately 5V DC. This embodiment is specifically designed to provide approximately four times as much power as a standard USB hub to enable devices with higher power requirements to be charged while connected to the USB port 10. For example, the current version of the iPad™ available from Apple Inc. draws 2.1 A of power at around 5V DC.

In one embodiment, the microcontroller 18 senses when a master computer is plugged into USB data input port 14. When the master computer is connected to USB data input port, the microcontroller causes the device attached to the USB port circuitry 12 to enter synchronizing mode, in which the device will draw a low level of current, e.g. to 500 mA. This allows the devices connected to the USB ports to continue to receive power at a low level while data synchronization is occurring between the master computer and the attached portable computing devices. When the master computer is disconnected from the USB data input port 14, the microcontroller causes the USB port circuitry to change state to a high output power state. In this state the USB port circuitry provides up to 2.1 A of output power at 5V DC to provide high charging current to devices attached to ports 12.

The microcontroller 18 is connected to each of the hub controllers 20, 26, 28 to allow the microcontroller 18 to reset the hub controllers in the event of a fault on one of the hub controllers. Operation of the hub controllers is otherwise independent of the microcontroller 18. Since USB hub controllers are standard components in USB hubs, a detailed description of how these components operate has not been provided as their configuration and operation would be known to persons of ordinary skill in the art. Likewise, other common components such as an interface to the microcontroller 18 may also be included to allow the microcontroller to be programmed and to determine how the microcontroller is operating to allow the logic implemented in the microcontroller to be adjusted to correct any deficiencies in the logic. These types of common components have not been included in the drawings to prevent obfuscation of the invention.

One example of USB port circuitry 12 that may be used to enable high output current levels (e.g. 2.1 A at 5V DC) to be selectively provided is shown in FIG. 2. In the embodiment shown in FIG. 2, the USB port circuitry 12 includes a high current Field Effect Transistor (FET) connected to power supply 40. One example of a high current FET that may be used to implement FET 44 is a MIC2042 MOSFET switch available from Micrel™. Other FETs may be used as well. A power filter 46 is also included to reduce the amount of noise transmitted over USB port 48. Preferably USB port 48 is configured as a USB Standard-A female receptacle. A 2.5 Amp fuse 54 is interconnected between power FET 44 and USB port 48 to provide over-current protection at the port 48.

The amount of current provided by power FET 44 on line 50 is controlled by microcontroller 18. Specifically, microcontroller 18 interfaces with Device Charging State Control 52 which has a resistor network interconnected between line 50 and ground. The device charging state control 52 switches the resistor network to control the voltage level on line 50 to cause the attached device to switch between synchronizing state, in which a low level of current is drawn by the device, and charging state, in which the device will draw a high level of current. For example, in synchronizing mode the output current from power FET may be on the order of up to 500 mA. When the hub is not in synchronizing mode, i.e. when a master computer is not connected to USB data input port 14, the microcontroller causes the voltage on line 50 to be adjusted to cause the attached device to draw up to 2.1 A of current on line 50 at USB port 48.

The USB hub controller is connected to USB port 48 to provide data to USB port 48. The manner in which the USB hub controller and USB port 48 are implemented are both well known in the art and will not be described in greater detail herein. The USB hub controller (20, 26, or 26 depending on which hub controller is connected to the particular instance of USB charging circuitry 12) is also connected to power FET 44. Connecting the USB hub controller to the power FET allows the USB hub controller to turn the power FET 44 off when the USB hub controller detects a fault at USB hub 48.

Microcontroller 18 is connected to a device charging state control 52 which is configured to control the portable computing device connected to USB port 48 to cause the portable computing device to toggle between charging mode and synchronizing mode. Some portable computing devices, such as the iPad™ from Apple Inc., sense the input voltage on line 50 and use the sensed input voltage to switch from charging mode to synchronizing mode. By applying the expected voltage on the output line 50, the USB charging circuitry can instruct an attached iPad to switch into synchronizing mode. In operation the device charging state control 52 receives input from microcontroller 18 and uses a resistor network to clamp the voltage on line 50 to a first value to cause the iPad to enter synchronizing state. Under the control of the microcontroller, the device charging state control 52 adjusts the resistor network to clamp the voltage on line 50 to a second value to cause the attached iPad to enter high current charging state.

In the embodiment shown in FIG. 2, a current sensor 56 detects a voltage drop across resistor 58 to determine an amount of power being drawn by the device connected to USB port 48. When a device is connected to USB port 48, power will be provided to the device to allow the device's battery to be charged. When power is being provided to the device, the current sensor will detect a voltage drop across resistor 58 above a first threshold value indicating that the device is charging. A "device charging" indicator 60 may be illuminated and an indication that the device is charging may be provided to microcontroller. As the battery is charged, it will draw less and less power on line 50. As the amount of power being drawn decreases, the voltage drop on resistor 58 will reduce below the threshold. At this point the current sensor will determine that the device has been fully charged and illuminate an indicator 62 indicating that the device has been charged. The current sensor will also provide input to the microcontroller indicating that the device connected to the USB port has been fully charged. The indicators 60, 62, may be implemented as yellow and green LEDs, respectively, or using other colors as desired. Since each instance of USB charging circuitry includes status indicators, it is possible to individually determine the charged state of each of the devices attached to the USB ports.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A set of interconnected high current multi-port USB hubs, comprising:
    a first high current multi-port USB hub including a first plurality of USB ports, the first high current multi-port USB hub being configured to switch between synchronizing mode, in which low power and data is provided at the first plurality of USB ports, and high current charging mode, in which at least 2 Amps of approximately 5V DC power is provided at the first plurality of USB ports; and
    a second high current multi-port USB hub including a second plurality of USB ports, the second high current multi-port USB hub being configured to switch between synchronizing mode, in which low power and data is provided at the second plurality of USB ports, and high current charging mode, in which at least 2 Amps of approximately 5V DC power is provided at the second plurality of USB ports; and
    a first data connection from the first high current multi-port USB hub to the second high current multi-port USB hub;
    wherein the first high current multi-port USB hub is independently powered and controlled, the second high current multi-port USB hub is separately independently powered and controlled; and
    wherein the second independently powered and controlled high current multi-port USB hub is configured to switch to synchronizing mode based on input from the first independently powered and controlled high current multi-port USB hub on the data connection.

2. The set of interconnected high current multi-port USB hubs of claim 1, wherein the first data connection is a USB cable.

3. The set of interconnected high current multi-port USB hubs of claim 2, wherein the first high current multi-port USB hub has a USB Standard-A port, wherein the second high current multi-port USB hub has a USB Standard-B port, and wherein the first data connection extends from the USB Standard-A port on the first high current multi-port USB hub to the USB Standard-B port on the second high current multi-port USB hub.

4. The set of interconnected high current multi-port USB hubs of claim 1, further comprising a third high current multi-port USB hub including a third plurality of USB ports, the third high current multi-port USB hub being configured to switch between synchronizing mode, in which low power and data is provided at the third plurality of USB ports, and high current charging mode, in which at least 2 Amps of approximately 5V DC power is provided at the third plurality of USB ports; and a second data connection from the second high current multi-port USB hub to the third high current multi-port USB hub.

5. The set of interconnected high current multi-port USB hubs of claim 1, further comprising a data input port on the first high current multi-port USB hub to receive data for output via the first plurality of USB ports.

6. The set of interconnected high current multi-port USB hubs of claim 5, wherein the first data connection from the first high current multi-port USB hub to the second high current multi-port USB hub is configured to pass the data received on the data input port from the first high current multi-port USB hub to the second high current multi-port USB hub.

7. The set of interconnected high current multi-port USB hubs of claim 5, wherein the data input port on the first high current multi-port USB hub is a USB Standard-B port.

8. The set of interconnected high current multi-port USB hubs of claim 1, further comprising a microcontroller connected to the data input port to sense when a computer is connected to the input data port, and wherein connection of the computer to the input data port causes the microcontroller to control operation of the first USB hub to enable the first USB hub to switch into synchronizing mode, 9. A method of charging and synchronizing a plurality of portable computing devices, the method comprising the steps of:
    connecting a first plurality of portable computing devices to a first set of USB ports of a first high current multi-port USB hub, the first high current multi-port USB hub being configured to switch between synchronizing mode, in which low power and data is provided at the first set of USB ports, and high current charging mode, in which at least 2 Amps of approximately 5V DC power is provided at the first set of USB ports;
    connecting a second plurality of portable computing devices to a second set of USB ports of a second high current multi-port USB hub, the second high current multi-port USB hub being configured to switch between synchronizing mode, in which low power and data is provided at the second set of USB ports, and high current charging mode, in which at least 2 Amps of approximately 5V DC power is provided at the second set of USB ports; and
    interconnecting the first high current multi-port USB hub and second high current multi-port USB hub using a data connection to enable data to be transmitted from the first high current multi-port USB hub to the second high current multi-port USB hub during synchronizing mode;
    wherein the first high current multi-port USB hub is independently powered and controlled, the second high current multi-port USB hub is separately independently powered and controlled; and
    wherein the second independently powered and controlled high current multi-port USB hub is configured to switch to synchronizing mode based on input from the first independently powered and controlled high current multi-port USB hub on the data connection.

10. The method of claim 9, further comprising the steps of connecting a third plurality of portable computing devices to a third set of USB ports of a third high current multi-port USB hub, the third high current multi-port USB hub being configured to switch between synchronizing mode, in which low power and data is provided at the third set of USB ports, and high current charging mode, in which at least 2 Amps of approximately 5V DC power is provided at the third set of USB ports; and interconnecting the second high current multi-port USB hub and third high current multi-port USB hub to enable data to be transmitted from the second high current multi-port USB hub to the third high current multi-port USB hub during synchronizing mode.

11. A set of interconnected high current multi-port hubs, comprising:

a first high current multi-port hub including a first plurality of ports, the first high current multi-port hub being configured to switch between synchronizing mode, in which low power and data is provided at the first plurality of ports, and high current charging mode, in which at least 2Amps of approximately 5V DC power is provided at the first plurality of ports; and a second high current multi-port hub including a second plurality of ports, the second high current multi-port hub being configured to switch between synchronizing mode, in which low power and data is provided at the second plurality of ports, and high current charging mode, in which at least 2 Amps of approximately 5V DC power is provided at the second plurality of ports; and a first data connection from the first high current multi-port hub to the second high current multi-port hub;

wherein the first high current multi-port hub is independently powered and controlled, the second high current multi-port hub is separately independently powered and controlled; and wherein the second independently powered and controlled high current multi-port hub is configured to switch to synchronizing mode based on input from the first independently powered and controlled high current multi-port hub on the data connection.

12. The set of interconnected high current multi-port hubs of claim 11, wherein the first data connection is a cable.

13. The set of interconnected high current multi-port hubs of claim 11, further comprising a third high current multi-port hub including a third plurality of ports, the third high current multi-port hub being configured to switch between synchronizing mode, in which low power and data is provided at the third plurality of ports, and high current charging mode, in which at least 2 Amps of approximately 5V DC power is provided at the third plurality of ports; and a second data connection from the second high current multi-port hub to the third high current multi-port hub.

14. The set of interconnected high current multi-port hubs of claim 11, further comprising a data input port on the first high current multi-port hub to receive data for output via the first plurality of ports.

15. The set of interconnected high current multi-port hubs of claim 14, wherein the first data connection from the first high current multi-port hub to the second high current multi-port hub is configured to pass the data received on the data input port from the first high current multi-port hub to the second high current multi-port hub.

16. The set of interconnected high current multi-port hubs of claim 11, further comprising a microcontroller connected to the data input port to sense when a computer is connected to the input data port, and wherein connection of the computer to the input data port causes the microcontroller to control operation of the first hub to enable the first hub to switch into synchronizing mode.

17. A method of charging and synchronizing a plurality of portable computing devices, the method comprising the steps of:

connecting a first plurality of portable computing devices to a first set of ports of a first high current multi-port hub, the first high current multi-port hub being configured to switch between synchronizing mode, in which low power and data is provided at the first set of ports, and high current charging mode, in which at least 2 Amps of approximately 5V DC power is provided at the first set of ports;

connecting a second plurality of portable computing devices to a second set of ports of a second high current multi-port hub, the second high current multi-port hub being configured to switch between synchronizing mode, in which low power and data is provided at the second set of ports, and high current charging mode, in which at least 2 Amps of approximately 5V DC power is provided at the second set of ports; and interconnecting the first high current multi-port hub and second high current multi-port hub using a data connection to enable data to be transmitted from the first high current multi-port hub to the second high current multi-port hub during synchronizing mode;

wherein the first high current multi-port hub is independently powered and controlled, the second high current multi-port hub is separately independently powered and controlled; and wherein the second independently powered and controlled high current multi-port hub is configured to switch to synchronizing mode based on input from the first independently powered and controlled high current multi-port hub on the data connection.

18. The method of claim 17, further comprising the steps of connecting a third plurality of portable computing devices to a third set of ports of a third high current multi-port hub, the third high current multi-port hub being configured to switch between synchronizing mode, in which low power and data is provided at the third set of ports, and high current charging mode, in which at least 2 Amps of approximately 5V DC power is provided at the third set of ports; and interconnecting the second high current multi-port hub and third high current multi-port hub to enable data to be transmitted from the second high current multi-port hub to the third high current multi-port hub during synchronizing mode.

* * * * *